US012589707B2

(12) United States Patent
Sato

(10) Patent No.: US 12,589,707 B2
(45) Date of Patent: Mar. 31, 2026

(54) VEHICLE CONTROL UNIT AND VEHICLE CONTROL SYSTEM WITH CONTROL UNIT CONFIGURED TO SELECTIVELY SUPPLY POWER TO A LOAD

(71) Applicant: Yazaki Corporation, Tokyo (JP)

(72) Inventor: Kazuya Sato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 765 days.

(21) Appl. No.: 17/860,242

(22) Filed: Jul. 8, 2022

(65) Prior Publication Data

US 2023/0030477 A1 Feb. 2, 2023

(30) Foreign Application Priority Data

Jul. 28, 2021 (JP) ................................. 2021-123576

(51) Int. Cl.
*B60R 16/033* (2006.01)
*H02J 7/00* (2006.01)
*H02J 7/82* (2026.01)

(52) U.S. Cl.
CPC .............. *B60R 16/033* (2013.01); *H02J 7/82* (2026.01); *H02J 7/855* (2026.01)

(58) Field of Classification Search
CPC ................................................ B60R 16/033
USPC ...................................................... 320/127
See application file for complete search history.

(56) References Cited

U.S. PATENT DOCUMENTS

| | | | | |
|---|---|---|---|---|
| 2010/0280740 A1* | 11/2010 | Oe | ......................... | B60W 10/06 60/285 |
| 2011/0072290 A1* | 3/2011 | Davis | ......................... | G06F 1/30 713/340 |
| 2015/0127206 A1 | 5/2015 | Tsuji et al. | | |
| 2015/0298630 A1 | 10/2015 | Iwai | | |
| 2016/0233563 A1* | 8/2016 | Oshima | ............. | H01M 10/6569 |
| 2017/0021739 A1* | 1/2017 | Tsuji | ...................... | B62K 11/04 |
| 2019/0047560 A1* | 2/2019 | Kinoshita | ............. | B60R 16/033 |
| 2019/0115703 A1 | 4/2019 | Kawaguchi et al. | | |
| 2019/0173240 A1 | 6/2019 | Nakamura et al. | | |
| 2020/0238849 A1 | 7/2020 | Kusada et al. | | |

FOREIGN PATENT DOCUMENTS

| | | | |
|---|---|---|---|
| JP | 2008-290513 A | 12/2008 | |
| JP | 2014-46718 A | 3/2014 | |
| JP | 2016-210240 A | 12/2016 | |
| JP | 2017-216826 A | 12/2017 | |
| JP | 2019-75893 A | 5/2019 | |
| JP | 2019-98978 A | 6/2019 | |
| JP | 2020-117178 A | 8/2020 | |
| JP | 3227324 U | 8/2020 | |

(Continued)

*Primary Examiner* — Yalkew Fantu

(74) *Attorney, Agent, or Firm* — Sughrue Mion, PLLC

(57) ABSTRACT

A vehicle control unit includes a control unit connectable to a first power supply line of a vehicle, a load connectable to the control unit, a detachable internal rechargeable battery, and a housing configured to accommodate the control unit and the internal rechargeable battery therein. The control unit is configured to selectively supply, to the load, one of first power-supply electric power supplied from the first power supply line and second power-supply electric power supplied from the internal rechargeable battery according to a situation.

6 Claims, 5 Drawing Sheets

(56)        References Cited

FOREIGN PATENT DOCUMENTS

| | | | |
|---|---|---|---|
| JP | 2021-8755 | A | 1/2021 |
| JP | 3231092 | U | 3/2021 |
| WO | 2018/031719 | A1 | 2/2018 |

* cited by examiner

VEHICLE CONTROL UNIT AND VEHICLE CONTROL SYSTEM WITH CONTROL UNIT CONFIGURED TO SELECTIVELY SUPPLY POWER TO A LOAD

CROSS-REFERENCE TO RELATED APPLICATIONS

This application is based on and claims priority under 35 USC 119 from Japanese Patent Application No. 2021-123576 filed on Jul. 28, 2021, the contents of which are incorporated herein by reference.

TECHNICAL FIELD

The present disclosure relates to a vehicle control unit and a vehicle control system configured to be used by being connected to a vehicle.

BACKGROUND ART

In an environment where people temporarily live outdoors such as a case where people camp in leisure time, a commercial power supply is not available in many cases because the environment is not indoors. However, in order to use various devices such as lighting, heating, and cooling, which are convenient for life, a power supply is usually required. In addition, for example, in an event of a disaster, it is also necessary to temporarily live outdoors, and thus a power supply that can be used in life is required.

On the other hand, when living outdoors, a user often stays in his or her own vehicle or in the vicinity thereof. In addition, since a vehicle is generally equipped with a power source such as an in-vehicle battery or a generator that generates electric power by an output of an engine in many cases, power-supply electric power of the vehicle can be used for outdoor life.

For example, JP-A-2020-117178 discloses a technique for using a vehicle as a power supply when the vehicle is in a disaster occurrence area. The vehicle of JP-A-2020-117178 includes a drive unit capable of generating electric power using fuel and capable of outputting power for traveling, a power storage device configured to exchange electric power with the drive unit, a power supply device capable of supplying electric power generated by the drive unit and/or electric power from the power storage device to an external device, and a control device configured to control the drive unit and the power supply device. When the vehicle is in a disaster occurrence region, the control device executes a recommendation process of prompting a user to set a charging priority mode in which charging of the power storage device is prioritized over traveling.

Further, JP-A-2021-8755 discloses a technique for easily opening and closing a shutter at the time of a power failure. An opening/closing body device includes an opening/closing unit provided at a peripheral portion of an opening, an opening/closing control unit configured to control the opening/closing unit, a conversion unit configured to perform DC-AC conversion on an external power supply, and a switching unit configured to switch the power supply at the time of a power failure. The opening/closing control unit electrically controls each operation of opening, closing, and stop of the opening/closing unit. The conversion unit converts DC electric power input from the in-vehicle battery into AC electric power having the same voltage as that of a commercial power supply, and outputs the AC electric power. The switching unit supplies the electric power of the commercial power supply to the opening/closing control unit, and supplies the output of the conversion unit to the opening/closing control unit at the time of power failure of the commercial power supply.

Further, JP-UM-B-3231092 discloses a technique of a spot cooler for an open cabin vehicle which is used by being mounted on a forklift. The spot cooler includes a housing in which an external air intake port, a blower port, and a heat exhaust port are disposed and in which a cooling unit, a blower fan, and a power supply unit are housed, and a housing mounting portion for detachably mounting the housing to a rear portion or a side portion of an operating seat of the forklift. In addition, the power supply unit includes a transformation processing device that automatically transforms a power supply voltage supplied from the forklift to an operating voltage of the cooling unit and the blower fan.

Further, JP-UM-B-3227324 discloses that a sub-battery is prepared in addition to a battery mounted on a vehicle, the sub-battery is charged via a cigar socket provided in the vehicle, and 13.8 V is generated from the sub-battery using a booster circuit to operate an electrical component.

However, in many cases, a situation in which functions such as lighting, heating, and cooling are required in the outdoor life is when the vehicle is parked. Therefore, when lighting, heating, cooling, or the like is used by the operation of a device mounted on the vehicle or an external device connected to the power supply of the vehicle, there is a concern that the power-supply electric power stored in the in-vehicle battery may be consumed which causes battery exhaustion. When battery exhaustion occurs, the vehicle falls into a state in which the vehicle cannot travel, and therefore, it is necessary to charge the battery with the help of others such as road service.

On the other hand, when a device for lighting, heating, cooling or the like is used for a long period of time while the engine of the vehicle is maintained in an idling state in order to prevent battery exhaustion of the vehicle, a large amount of fuel such as gasoline is consumed even though the vehicle is not moved. As a result, there is a concern about an increase in load on the environment.

SUMMARY OF INVENTION

The present disclosure has been made in view of the above circumstances, and an object thereof is to provide a vehicle control unit with which occurrence of battery exhaustion when a vehicle is parked can be prevented and various devices that require power-supply electric power can be used while idling of an engine is stopped.

In order to achieve the above-described object, a vehicle control unit and a vehicle control system according to the present disclosure are characterized as follows.

According to an aspect of the present disclosure, there is provided a vehicle control unit including: a control unit connectable to a first power supply line of a vehicle, a load connectable to the control unit, a detachable internal rechargeable battery, and a housing configured to accommodate the control unit and the internal rechargeable battery therein, in which the control unit is configured to selectively supply, to the load, one of first power-supply electric power supplied from the first power supply line and second power-supply electric power supplied from the internal rechargeable battery according to a situation.

According to an aspect of the present disclosure, there is provided a vehicle control system including: the vehicle control unit according to the above, an in-vehicle battery, and the first power supply line, in which one end of the first power supply line is connected to the in-vehicle battery, and the control unit is configured to supply power-supply electric power of the in-vehicle battery as the first power-supply electric power, and supply power-supply electric power of the internal rechargeable battery as the second power-supply electric power.

According to the vehicle control unit and the vehicle control system of the present disclosure, the occurrence of battery exhaustion in a state where a vehicle is parked can be prevented. In addition, even when the vehicle is parked or in a stopped state in which idling of an engine is stopped, electric power can be supplied to various devices (loads) that require power-supply electric power, so that improvement in convenience when people live in an outdoor environment such as in leisure time or in the event of a disaster can be expected.

The present disclosure has been briefly described above. Details of the present disclosure will be further clarified by reading a mode (hereinafter, referred to as "embodiment") for carrying out the present disclosure described below with reference to the accompanying drawings.

BRIEF DESCRIPTION OF DRAWINGS

FIG. 2 is an electric circuit diagram showing a second configuration example of the vehicle control unit according to the embodiment of the present disclosure.

FIG. 3 is an electric circuit diagram showing a third configuration example of the vehicle control unit according to the embodiment of the present disclosure.

DESCRIPTION OF EMBODIMENTS

A specific embodiment according to the present disclosure will be described with reference to drawings.

Figure 1:
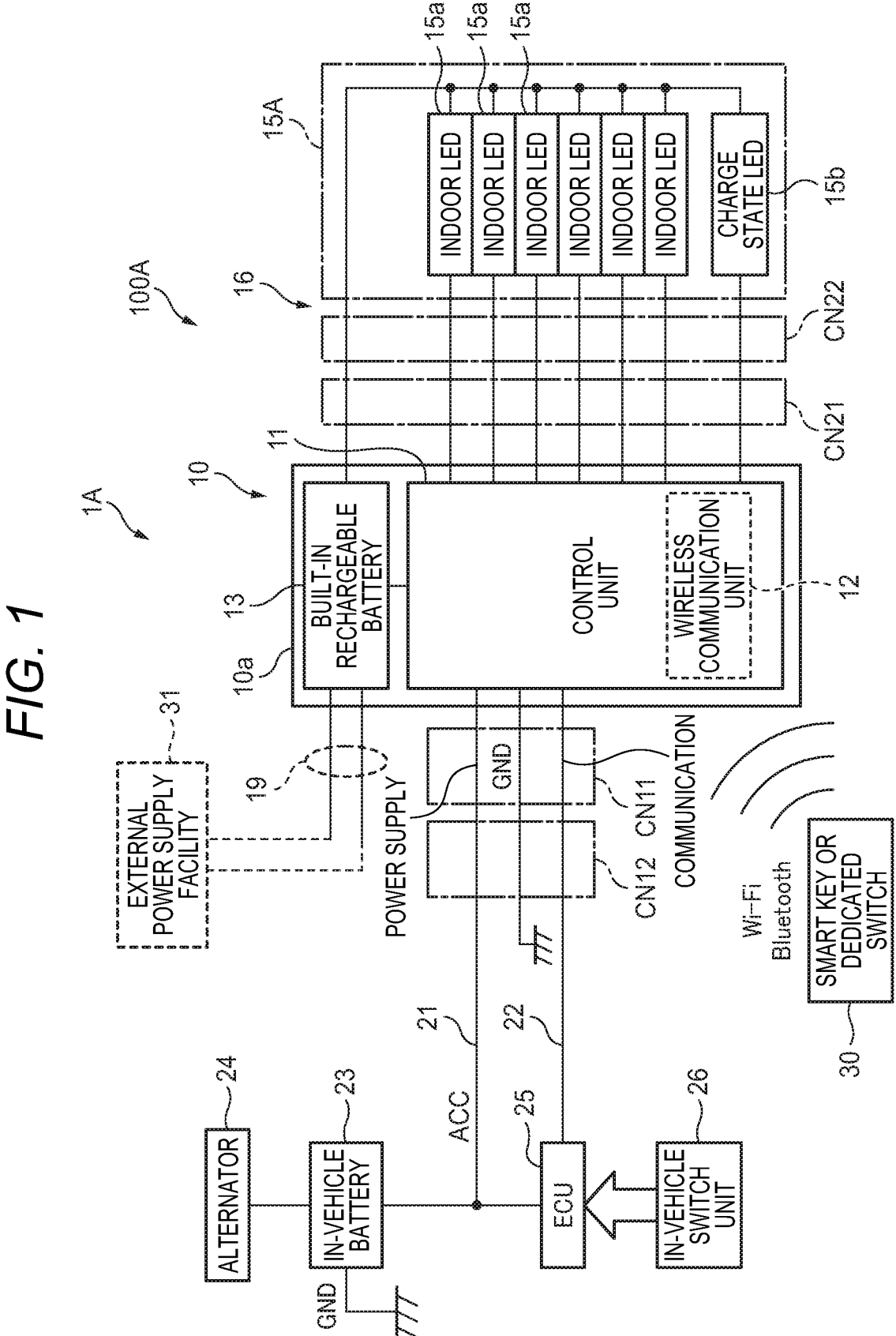
FIG. 1 is an electric circuit diagram showing a first configuration example of a vehicle control unit according to an embodiment of the present disclosure.
Figure 2:
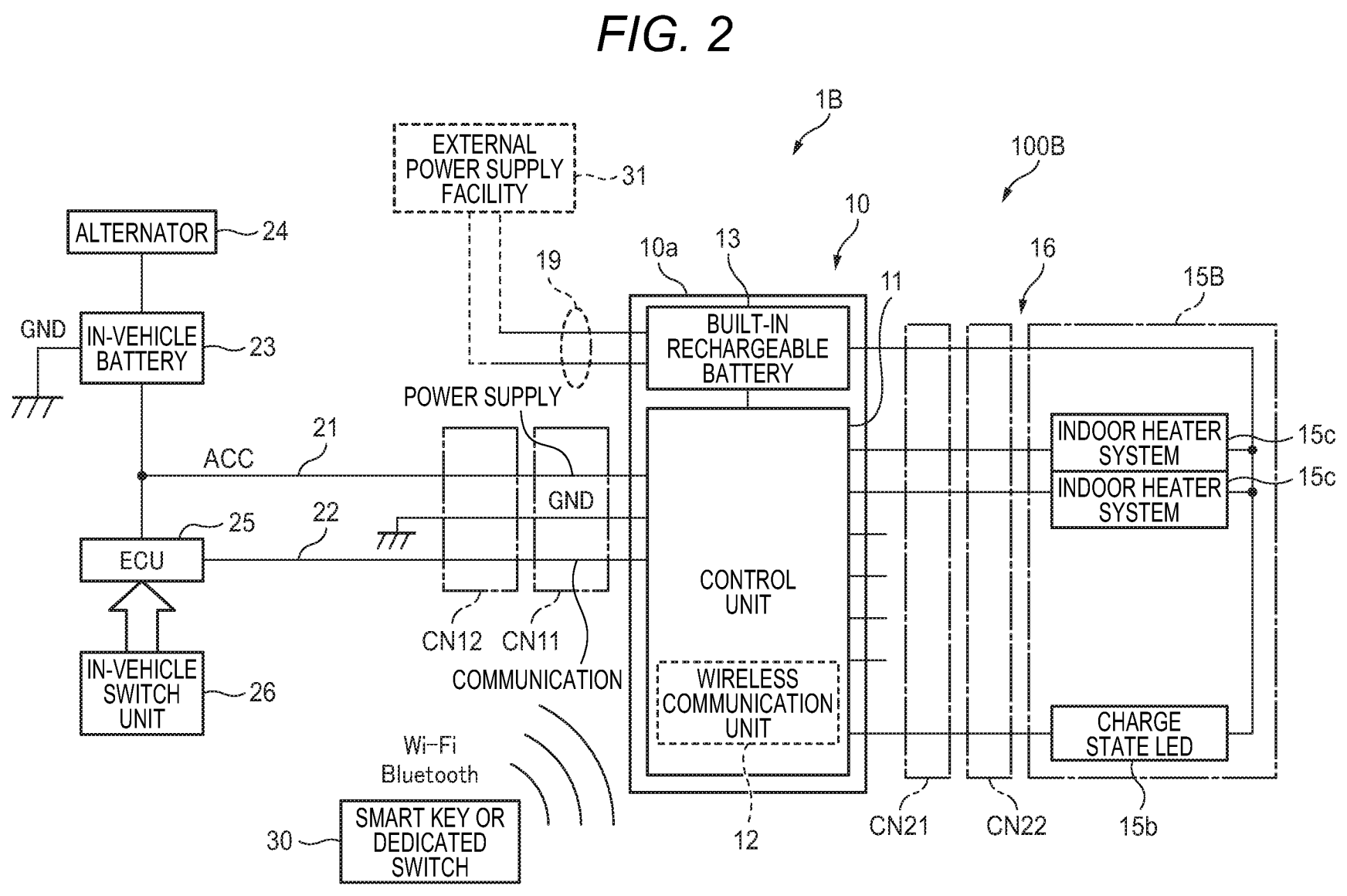
Figure 3:
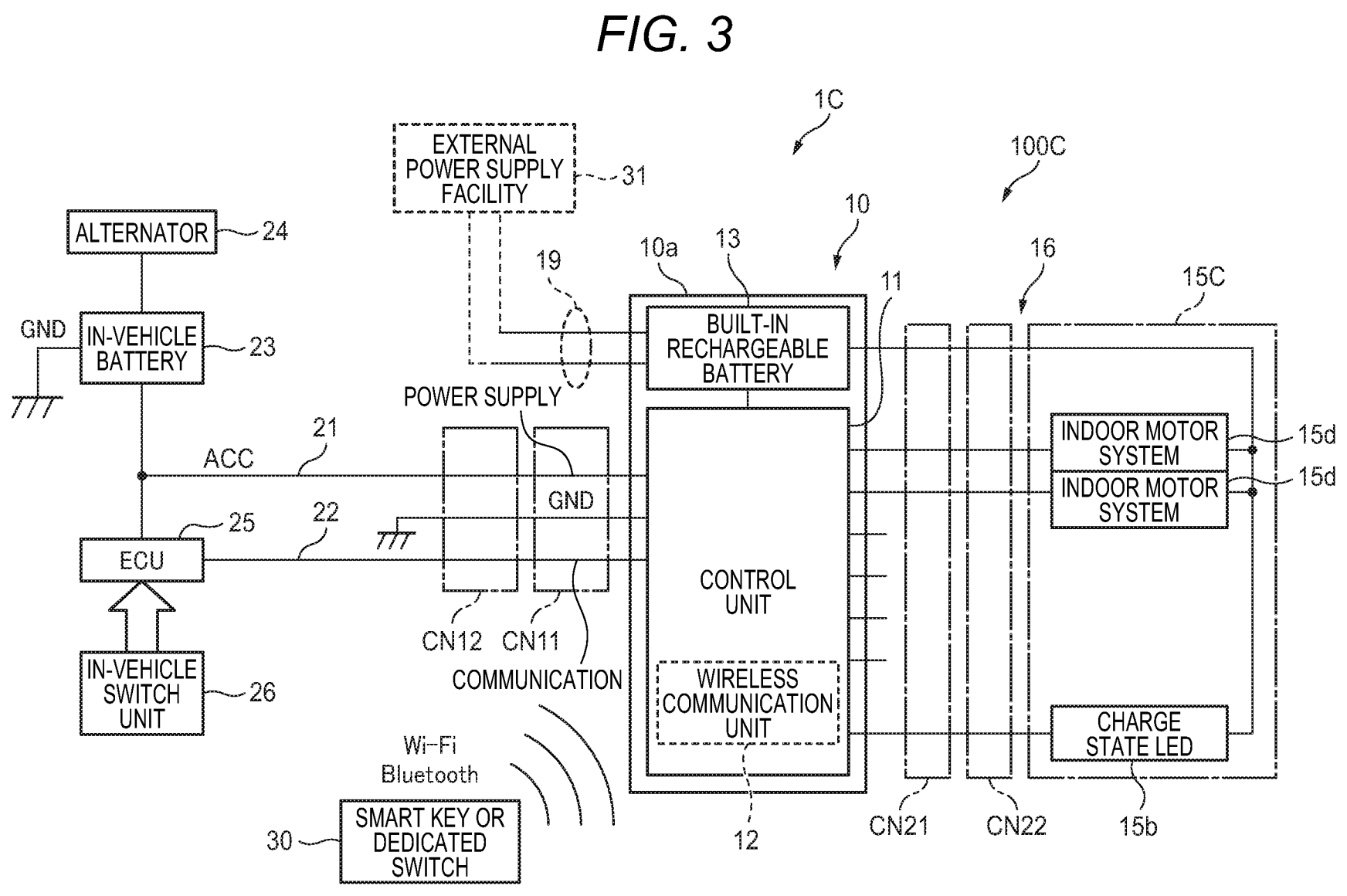

FIG. 1 is an electric circuit diagram showing a first configuration example of a vehicle control unit according to an embodiment of the present disclosure. FIG. 2 is an electric circuit diagram showing a second configuration example of the vehicle control unit according to the embodiment of the present disclosure. FIG. 3 is an electric circuit diagram showing a third configuration example of the vehicle control unit according to the embodiment of the present disclosure. The configuration of each vehicle control unit will be described below.

First Configuration Example

A vehicle control unit 100A shown in FIG. 1 includes a connector CN11, a unit main body 10, and a load module 15A. The connector CN11 of the vehicle control unit 100A is connected to a connector CN12 provided on a vehicle. The connector CN11 and the connector CN12 may be collectively referred to as a third connector CN11 and CN12. The vehicle control unit 100A constitutes a vehicle control system 1A together with an in-vehicle battery 23, the connector CN12, and an in-vehicle switch unit 26 mounted on the vehicle.

The connectors CN11 and CN12 are used to connect a power supply line 21, a communication line 22, and a ground GND. The power supply line 21 supplies power-supply electric power (ACC) of an accessory system on the vehicle.

The power-supply electric power ACC is supplied from the in-vehicle battery 23. An alternator 24, which is a generator of the vehicle, is connected to an input side of the in-vehicle battery 23. Therefore, when the engine of the vehicle is operating or when the vehicle is traveling, the in-vehicle battery 23 can be charged by the electric power output from the alternator 24.

In the case of a vehicle having a built-in high-voltage power supply, such as an electric vehicle or a plug-in hybrid vehicle, an output of the high-voltage power supply is connected to the in-vehicle battery 23 via a predetermined DC/DC converter instead of the alternator 24.

The power-supply electric power ACC is also supplied when the ignition of the vehicle is off. If the power-supply electric power ACC is excessively used, there is a possibility that the in-vehicle battery 23 runs out and the engine may not be started. Therefore, it is necessary to reduce the use of the power-supply electric power ACC.

The vehicle control unit 100A shown in FIG. 1 is configured as an optional equipment of the vehicle for the user to select as necessary and can be easily connect to the vehicle, for example, by retrofitting. The vehicle control unit 100A enables the user of the vehicle to use an illumination function that is convenient when the user lives outdoors while using the vehicle.

That is, the load module 15A includes a large number of indoor illumination light emitting diodes (LEDs) 15a. These indoor illumination LEDs 15a are illumination light sources mounted in the vehicle, and may include, for example, a dome lamp, a personal lamp, an indoor decorative illumination, and a sterilization lamp (deep ultraviolet LED).

The unit main body 10 includes a control unit 11, a wireless communication unit 12, and a built-in rechargeable battery 13 which are accommodated in a box-shaped housing 10a. When the built-in rechargeable battery 13 is relatively small, the unit main body 10 may be accommodated in a housing of the connector CN11 to be integrated therewith.

The control unit 11 is implemented by, for example, an electronic circuit with a microcomputer as a main body, and has a wired communication function. The control unit 11 can also perform wireless communication by using the wireless communication unit 12. The microcomputer of the control unit 11 can execute various controls including turning on and turning off each of the indoor illumination LEDs 15a in the load module 15A, for example, by executing a program incorporated in advance.

The wireless communication unit 12 is a communication module that enables wireless communication corresponding to a standard communication specification such as Wi-Fi (registered trademark) or Bluetooth (registered trademark), and is capable of relatively short-range wireless communication. In the present embodiment, the wireless communication unit 12 is used to enable communication with a smart key 30 and the like.

The built-in rechargeable battery 13 is accommodated in the housing 10a in a detachable or replaceable state. The built-in rechargeable battery 13 is implemented by, for example, a lithium ion battery. The built-in rechargeable battery 13 is connected to the control unit 11 and the load module 15A so as to be supply power-supply electric power thereto. A charging cable 19 is connected to a charging circuit of the built-in rechargeable battery 13.

The charging cable 19 is used to connect the vehicle and a predetermined external power supply facility 31 in a state where the vehicle is stopped in the vicinity of a place where the external power supply facility 31 is installed. The power-supply electric power supplied from the external power supply facility 31 can be supplied to the built-in rechargeable battery 13 in the unit main body 10 via the charging cable 19 to charge the built-in rechargeable battery 13.

The load module 15A shown in FIG. 1 includes a charge state LED 15b. The charge state LED 15b is implemented by a multicolor LED, and is used to display a remaining amount of electric power stored in the built-in rechargeable battery 13 by a difference in color.

In the vehicle shown in FIG. 1, various switches (SW) are installed at positions where a user such as a driver can operate. These switches are included in the in-vehicle switch unit 26.

An electronic control unit (ECU) 25 mounted on the vehicle can read a state of each switch in the in-vehicle switch unit 26. Electric power is supplied from an output of the in-vehicle battery 23 to a power supply input of the ECU 25.

The ECU 25 has a communication function corresponding to a communication standard for a vehicle such as a controller area network (CAN), and can communicate with the vehicle control unit 100A, other in-vehicle ECUs, and the like via the communication line 22. The communication line 22 of the ECU 25 is connected to the control unit 11 via the connectors CN12 and CN11 in a wired manner.

The smart key 30 has a function of performing locking or unlocking of a door lock by wireless communication, similarly to a general smart key for a vehicle. The smart key 30 shown in FIG. 1 also includes a switch to which a function of switching on and off of an in-vehicle lighting in the vehicle control unit 100A is assigned.

The smart key 30 includes a communication module that enables wireless communication corresponding to standards such as Wi-Fi and Bluetooth, and can perform wireless communication with the wireless communication unit 12 in the vehicle control unit 100A. Instead of the smart key 30, a dedicated remote control switch specialized only for the operation function of the vehicle control unit 100A or a smart phone may be used. A smartphone is normally equipped with a wireless communication function such as Wi-Fi or Bluetooth as standard, so that the vehicle control unit 100A can be operated by wirelessly communicating with the unit main body 10 by incorporating a dedicated application for operating the vehicle control unit 100A.

As shown in FIG. 1, a wire harness 16 connected to the load module 15A includes a connector CN22. In addition, since the connector CN21 provided in the unit main body 10 has a shape that can be fitted to the connector CN22, the unit main body 10 and the load module 15A can be connected via the connectors CN21 and CN22. The connector CN21 may also be referred to as a first connector CN21, and the connector CN22 may also be referred to as a second connector CN22.

Therefore, when the load module 15A is mounted on the vehicle in advance as an in-vehicle function, the function of the vehicle control unit 100A can be achieved only by adding the unit main body 10 to the vehicle and connecting the connectors CN21 and CN22.

Even when the load module 15A is not mounted in the vehicle in advance, the vehicle control unit 100A can be used by newly adding the unit main body 10 and the load module 15A.

The unit main body 10 and the load module 15A may be directly connected to each other without the connectors CN21 and CN22 interposed therebetween. Alternatively, the power supply line 21, the communication line 22, and the ground GND may be directly connected to the unit main body 10 without the connectors CN11 and CN12 interposed therebetween.

Second Configuration Example

A vehicle control unit 100B shown in FIG. 2 includes the connector CN11, the unit main body 10, and a load module 15B. The connector CN11 of the vehicle control unit 100B is connected to the connector CN12 provided on the vehicle. The vehicle control unit 100B constitutes a vehicle control system 1B together with the in-vehicle battery 23, the connector CN12, and the in-vehicle switch unit 26 mounted on the vehicle.

The connectors CN11 and CN12 are used to connect the power supply line 21, the communication line 22, and the ground GND. The power supply line 21 supplies the power-supply electric power ACC of the accessory system on the vehicle.

Therefore, the configuration of the vehicle control unit 100B shown in FIG. 2 is substantially the same as that of the vehicle control unit 100A shown in FIG. 1 except that the type and the number of loads of the load module 15B are different. That is, the two types of vehicle control units 100A and 100B can be easily selected and replaced by the user as necessary.

The load module 15B shown in FIG. 2 includes a plurality of in-vehicle heater system loads 15c. A typical example of the in-vehicle heater system load 15c that can be mounted on the load module 15B include a seat heater, an armrest heater, and a foot heater.

The load module 15B also includes the charge state LED 15b.

The wire harness 16 connected to the load module 15B includes the connector CN22. In addition, since the connector CN21 provided in the unit main body 10 has a shape that can be fitted to the connector CN22, the unit main body 10 and the load module 15B can be connected via the connectors CN21 and CN22.

Therefore, when the load module 15B is mounted on the vehicle in advance as an in-vehicle function, the function of the vehicle control unit 100B can be achieved only by adding the unit main body 10 to the vehicle and connecting the connectors CN21 and CN22.

Even when the load module 15B is not mounted in the vehicle in advance, the vehicle control unit 100B can be used by newly adding the unit main body 10 and the load module 15B.

The unit main body 10 and the load module 15B may be directly connected to each other without the connectors CN21 and CN22 interposed therebetween. Alternatively, the power supply line 21, the communication line 22, and the ground GND may be directly connected to the unit main body 10 without the connectors CN11 and CN12 interposed therebetween.

Third Configuration Example

A vehicle control unit 100C shown in FIG. 3 includes the connector CN11, the unit main body 10, and a load module 15C. The connector CN11 of the vehicle control unit 100C is connected to the connector CN12 provided on the vehicle. The vehicle control unit 100C constitutes a vehicle control system 1C together with the in-vehicle battery 23, the connector CN12, and the in-vehicle switch unit 26 mounted on the vehicle.

The connectors CN11 and CN12 are used to connect the power supply line 21, the communication line 22, and the ground GND. The power supply line 21 supplies the power-supply electric power ACC of the accessory system on the vehicle.

Therefore, the configuration of the vehicle control unit 100C shown in FIG. 3 is substantially the same as that of the vehicle control units 100A and 100B except for a load module 15C. That is, the three types of vehicle control units 100A, 100B, 100C can be easily selected and replaced by the user as necessary.

The load module 15C shown in FIG. 3 includes a plurality of in-vehicle motor system loads 15d. A typical example of the in-vehicle motor system load 15d that can be mounted on the load module 15C is a small fan (with a swing function).

The load module 15C also includes the charge state LED 15b.

The wire harness 16 connected to the load module 15C includes the connector CN22. In addition, since the connector CN21 provided in the unit main body 10 has a shape that can be fitted to the connector CN22, the unit main body 10 and the load module 15C can be connected via the connectors CN21 and CN22.

Therefore, when the load module 15C is mounted on the vehicle in advance as an in-vehicle function, the function of the vehicle control unit 100C can be achieved only by adding the unit main body 10 to the vehicle and connecting the connectors CN21 and CN22.

Even when the load module 15C is not mounted in the vehicle in advance, the vehicle control unit 100C can be used by newly adding the unit main body 10 and the load module 15C.

The unit main body 10 and the load module 15C may be directly connected to each other without the connectors CN21 and CN22 interposed therebetween. Alternatively, the power supply line 21, the communication line 22, and the ground GND may be directly connected to the unit main body 10 without the connectors CN11 and CN12 interposed therebetween.

Figure 4:
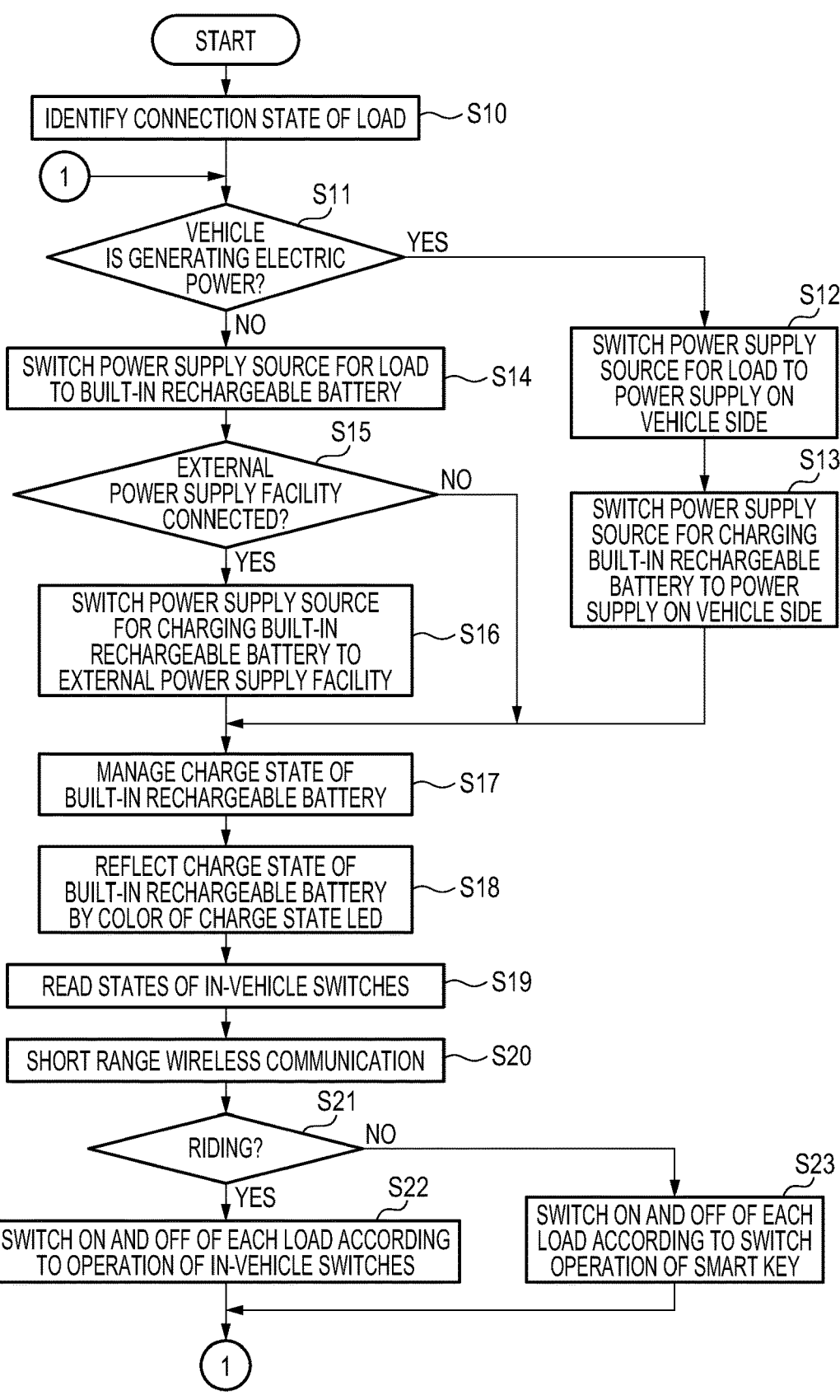
FIG. 4 is a flowchart showing a main operation of a control unit.

FIG. 4 is a flowchart showing a main operation of the controller 11 in the vehicle control units 100A, 100B, and 100C. The operation of FIG. 4 will be described below.

In S10, the control unit 11 identifies a connection state of the load module connected downstream of the connector CN21. For example, a type of the connector CN22 connected to the connector CN21, whether or not a load is connected to each terminal of the connector CN22, impedance of a load connected to each terminal, and the like are detected. Accordingly, it is possible to grasp which of the load modules 15A, 15B, and 15C is connected, and to specify a position of the terminal to which a load is connected. By reflecting an identification result in the control of the control unit 11, it is possible to perform control suitable for respective characteristics of the load modules 15A, 15B, and 15C.

In S11, in order to grasp whether or not there is a margin in the power supply on the vehicle side including the in-vehicle battery 23, the control unit 11 identifies whether or not the vehicle is generating electric power. For example, whether or not the alternator 24 is generating electric power can be identified by comparing a voltage of the power supply line 21 with a predetermined threshold value. Alternatively, information indicating whether or not the vehicle is generating electric power can be acquired from the ECU 25 by communication using the communication line 22.

When the vehicle is generating electric power, the process proceeds from S11 to S12. Then, in S12, the control unit 11 selects the electric power ACC of the power supply line 21 on the vehicle side as a power supply source for the power supply of the control unit 11 and each load of the load module. In addition, in S13, the control unit 11 selects the electric power ACC of the power supply line 21 on the vehicle side as the power supply source for charging the built-in rechargeable battery 13.

On the other hand, when the vehicle is not generating electric power, the process proceeds from S11 to S14. Then, in S14, the control unit 11 selects the electric power output from the built-in rechargeable battery 13 as the power supply source for the power supply of the control unit 11 and each load of the load module.

When the charging input of the built-in rechargeable battery 13 is connected to the external power supply facility 31 via the charging cable 19, the process proceeds from S15 to S16, and the control unit 11 selects the electric power of the external power supply facility 31 as the power supply source for charging the built-in rechargeable battery 13.

In S17, the control unit 11 manages a charge state and a storage state of the built-in rechargeable battery 13. For example, an actual state of the built-in rechargeable battery 13 is grasped by monitoring values of a charge current, a discharge current, an output voltage, and the like and changes thereof in the built-in rechargeable battery 13. Next, in S18, the control unit 11 reflects the charge state and the storage state of the built-in rechargeable battery 13 in display of the charge state LED 15b. In the present embodiment, the difference in the charge state and the storage state is expressed by a difference in color of light emitted from the charge state LED 15b.

In S19, the control unit 11 communicates with the ECU 25 via the communication line 22, and reads a state of each switch of the in-vehicle switch unit 26. In S20, the control unit 11 uses the wireless communication unit 12 to perform wireless communication at a relatively short range with the smart key 30.

In S21, the control unit 11 identifies whether or not the user such as a driver is riding in the own vehicle. For example, it is possible to identify whether or not the user is riding in the own vehicle by detecting whether or not each seat is occupied or by detecting whether or not the smart key 30 is in the vicinity of the driver's seat.

When the user is riding in the own vehicle, the control unit 11 switches on and off of each load in the load module according to an operation state of the in-vehicle switches included in the in-vehicle switch unit 26 (S22). That is, the control unit 11 supplies the power-supply electric power when each load is turned on, and cuts off the supply of the power-supply electric power when each load is turned off.

On the other hand, when the user is outside the vehicle, the control unit 11 switches on and off of each load according to a switch operation state of the smart key 30 (S23).

Figure 5:
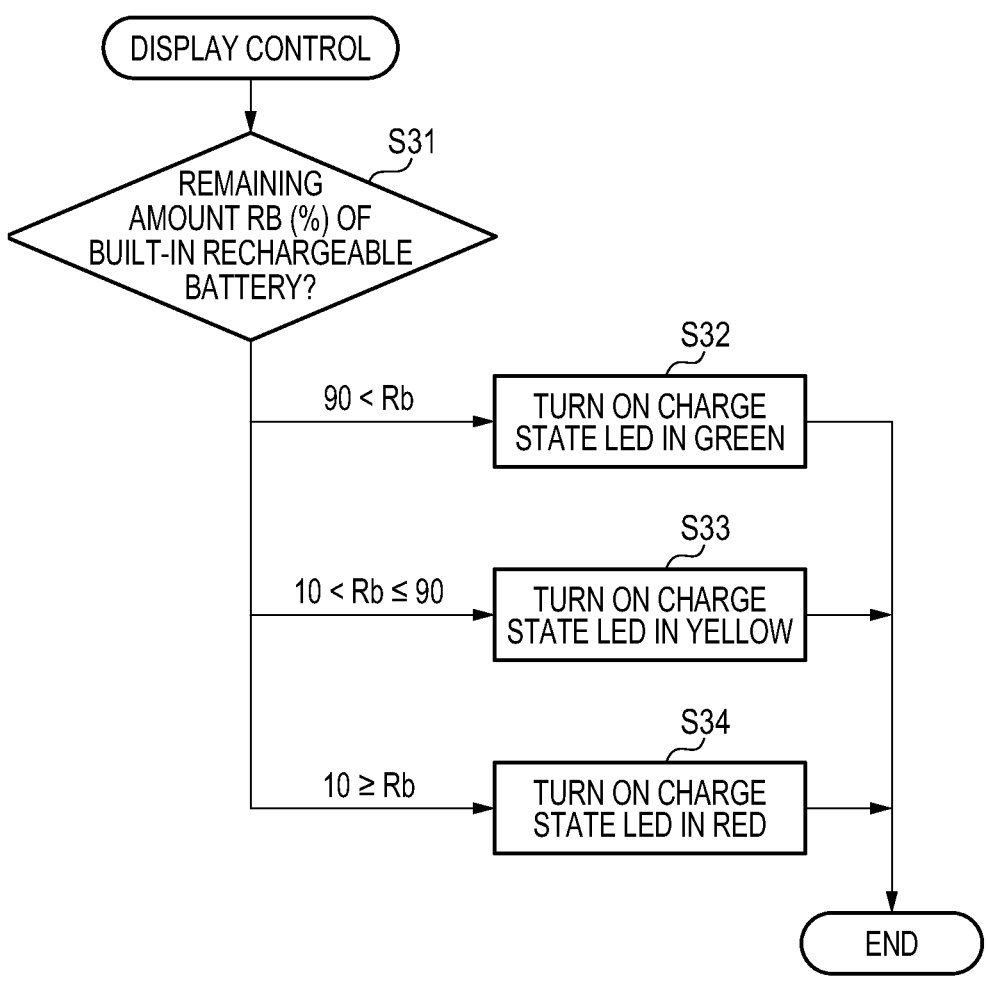
FIG. 5 is a flowchart showing display control.

FIG. 5 is a flowchart showing display control. That is, the details of step S18 in FIG. 4 are shown in FIG. 5. The operation shown in FIG. 5 will be described below.

The control unit 11 compares a remaining amount Rb (%) of the electric power stored in the built-in rechargeable battery 13 with predetermined thresholds 10 and 90. When "90<Rb", the process proceeds to S32, when "10<Rb≤90", the process proceeds to S33, and when "10≥Rb", the process proceeds to S34.

The remaining amount Rb of electric power can be estimated by calculation based on, for example, a change in voltage or an amount of electric power consumed from a reference state, for example, a state where the built-in rechargeable battery 13 is fully charged (100%).

When "90<Rb", the control unit 11 performs display control such that the charge state LED 15*b* is turned on in green. When "10<Rb≤90", the display control is performed such that the charge state LED 15*b* is turned on in yellow. When "10≥Rb", the display control is performed such that the charge state LED 15*b* is turned on in red.

As described above, when any one of the vehicle control units 100A, 100B, and 100C according to the present embodiment is used, it is possible to conveniently use the functions such as lighting, heating, and cooling required when the user lives in the outdoor environment on the vehicle or in the vicinity of the vehicle, and it is possible to effectively prevent battery exhaustion of the vehicle.

That is, when the vehicle is in a parking state or in an idling stop state, the control unit 11 supplies power to the load modules 15A, 15B, 15C, and the like by using the electric power of the built-in rechargeable battery 13, and thus it is possible to avoid consumption of the electric power stored in the in-vehicle battery 23. Further, when the alternator 24 is generating electric power as in a case where the vehicle is in a travelling state, the built-in rechargeable battery 13 can be charged by using the power-supply electric power on the vehicle side, so that sufficient electric power can be stored in the built-in rechargeable battery 13 before the functions of the load modules 15A, 15B, and 15C are used. Further, since the built-in rechargeable battery 13 can be detached or replaced, even when the electric power stored in the built-in rechargeable battery 13 is consumed, the electric power of the built-in rechargeable battery 13 can be continuously used by replacement.

In addition, the unit main body 10 can be connected to connector CN12 on the vehicle side by using the standardized connector CN11 to which the power supply line 21, the communication line 22, and the ground can be connected, so that the user of the vehicle can selectively use the functions of the vehicle control units 100A, 100B, and 100C as necessary.

In addition, when the load modules 15A, 15B, and 15C are connected using the standardized connectors CN21 and CN22, the unit main body 10 having the same function can be connected to any of the vehicle control units 100A, 100B, and 100C, so that it is possible to improve convenience and reduce costs by standardizing parts.

It should be noted that the present disclosure is not limited to the above-described embodiment, and modifications, improvements, and the like can be made as appropriate. In addition, materials, shapes, dimensions, numbers, arrangement positions, and the like of the respective constituent elements in the above-described embodiment are set as desired and are not limited as long as the present disclosure can be achieved.

Here, characteristics of the vehicle control unit and vehicle control system according to the embodiment of the present disclosure will be briefly summarized in the following [1] to [7].

[1] A vehicle control unit (100A, 100B, 100C) including:
a control unit (11) connectable to a first power supply line (power supply line 21, ACC) of a vehicle;
a load (indoor illumination LEDs 15*a*, or in-vehicle heater system load 15*c*, or in-vehicle motor system loads 15*d*) connectable to the control unit;

a detachable internal rechargeable battery (built-in rechargeable battery 13); and
a housing (10*a*) configured to accommodate the control unit and the internal rechargeable battery therein,
wherein the control unit is configured to selectively supply, to the load, one of first power-supply electric power supplied from the first power supply line and second power-supply electric power supplied from the internal rechargeable battery according to a situation (S11, S12, S14).

According to the vehicle control unit having the configuration of [1], the first power-supply electric power on the vehicle and the second power-supply electric power supplied from the internal rechargeable battery can be selectively used as the power supply to be supplied to the load depending on the situation. Therefore, even when there is a possibility of battery exhaustion on the vehicle side, the load can be operated using the second power-supply electric power. Further, even when the electric power stored in the internal rechargeable battery is consumed, the amount of stored electric power can be recovered by charging the internal rechargeable battery when the load is not used. Further, the internal rechargeable battery can be replaced by detachment, so that the power-supply electric power can be supplied to the load almost continuously over a long period of time.

[2] The vehicle control unit according to [1], further including:
a first connector (CN11) connectable to the first power supply line (power supply line 21, ACC),
wherein the control unit (11) is supplied with the first power-supply electric power via the first connector.

According to the vehicle control unit having the configuration of [2], when a shape or the like of the first connector is standardized, it is possible to connect a plurality of vehicle control units of different types and a plurality of types of loads, and it is easy to selectively use them according to the application of each user.

[3] The vehicle control unit according to [1] or [2], further including:
an external power supply connection unit (charging cable 19) configured to connect an external power supply line of a power supply facility (external power supply facility 31) outside the vehicle with a charging circuit of the internal rechargeable battery,
wherein the control unit is configured to selectively supply, to the charging circuit of the internal rechargeable battery, one of the first power-supply electric power supplied from the first power supply line and third power-supply electric power supplied from the external power supply line according to a situation (S13, S15, S16).

According to the vehicle control unit having the configuration of [3], the internal rechargeable battery can be charged using the third power-supply electric power in an environment in which the predetermined power supply facility can be used. Therefore, it is possible to prevent the electric power stored in the in-vehicle battery from being consumed by the charging of the internal rechargeable battery. Further, even in an environment in which the power supply facility cannot be used, the internal rechargeable battery can be charged by the first power-supply electric power when there is a margin in the power supply on the vehicle side.

[4] The vehicle control unit according to any one of [1] to [3], wherein the control unit is configured to grasp a state of charge of the internal rechargeable battery (S17) and output information indicating the state of charge (S18).

According to the vehicle control unit having the configuration of [4], the user can grasp the state of charge of the internal rechargeable battery. Therefore, the user can easily determine whether or not the internal rechargeable battery needs to be charged or replaced based on the electric power to be consumed by a load to be used and the information on the state of charge of the internal rechargeable battery.

[5] The vehicle control unit according to any one of [1] to [4], wherein the control unit is configured to apply the first power-supply electric power supplied from the first power supply line to a charging circuit of the internal rechargeable battery to perform a charging operation of the internal rechargeable battery in a case that a power generation function of the vehicle is in operation (S11, S13).

According to the vehicle control unit having the configuration of [5], the internal rechargeable battery can be charged by applying the first power-supply electric power from the vehicle side while the vehicle is traveling or when the vehicle is stopped and the engine is in an idling state.

[6] The vehicle control unit according to any one of [1] to [5], wherein the control unit includes a wireless communication unit (12) configured to communicate with a predetermined wireless remote control unit (smart key 30) capable of receiving an input operation.

According to the vehicle control unit having the configuration of [6], the user can give an instruction to the control unit by operating the wireless remote control unit even when the user does not approach the vehicle.

[7] A vehicle control system (1A, 1B, 1C) including:

the vehicle control unit according to any one of [1] to [6];

an in-vehicle battery (23); and the first power supply line (power supply line 21, ACC), wherein one end of the first power supply line is connected to the in-vehicle battery, and wherein the control unit is configured to supply power-supply electric power of the in-vehicle battery as the first power-supply electric power, and supply power-supply electric power of the internal rechargeable battery as the second power-supply electric power.

According to the vehicle control system having the configuration of [7], the first power-supply electric power supplied from the in-vehicle battery and the second power-supply electric power supplied from the internal rechargeable battery can be selectively used as the power supply to be supplied to the load depending on the situation. Therefore, even when there is a possibility of battery exhaustion on the vehicle side, the load can be operated using the second power-supply electric power. Further, even when the electric power stored in the internal rechargeable battery is consumed, the amount of stored electric power can be recovered by charging the internal rechargeable battery when the load is not used. Further, the internal rechargeable battery can be replaced by detachment, so that the power-supply electric power can be supplied to the load almost continuously over a long period of time.

What is claimed is:

1. A vehicle control unit comprising:

a control unit connectable to a first power supply line of a vehicle;

a detachable internal rechargeable battery;

a housing configured to accommodate the control unit and the internal rechargeable battery therein;

a first connector connected to the control unit;

a plurality of load modules, each of which including loads, and a type and/or a number of the loads in each of the plurality of load modules are different; and a second connector connected to any one of the plurality of load modules, wherein the control unit is connected to one of the plurality of load modules by connecting the first connector to the second connector, wherein the control unit is configured to selectively supply, to the load through the first connector and the second connector, one of first power-supply electric power supplied from the first power supply line and second power-supply electric power supplied from the internal rechargeable battery according to a situation, and wherein the control unit grasps which of the plurality of load modules is connected to the control unit, and specifies a position of a terminal to which the load is connected, by identifying a type of the second connector, whether or not the load is connected to each terminal of the second connector, and impedance of the load connected to each terminal of the second connector.

2. The vehicle control unit according to claim 1, further comprising:

a third connector connectable to the first power supply line, wherein the control unit is supplied with the first power-supply electric power via the third connector.

3. The vehicle control unit according to claim 1, further comprising:

an external power supply connection unit configured to connect an external power supply line of a power supply facility outside the vehicle with a charging circuit of the internal rechargeable battery, wherein the control unit is configured to selectively supply, to the charging circuit of the internal rechargeable battery, one of the first power-supply electric power supplied from the first power supply line and third power-supply electric power supplied from the external power supply line according to a situation.

4. The vehicle control unit according to claim 1, wherein the control unit is configured to grasp a state of charge of the internal rechargeable battery and output information indicating the state of charge.

5. The vehicle control unit according to claim 1, wherein the control unit is configured to apply the first power-supply electric power supplied from the first power supply line to a charging circuit of the internal rechargeable battery to perform a charging operation of the internal rechargeable battery in a case that a power generation function of the vehicle is in operation.

6. A vehicle control system comprising:

the vehicle control unit according to claim 1;

an in-vehicle battery; and the first power supply line, wherein one end of the first power supply line is connected to the in-vehicle battery, and wherein the control unit is configured to supply power-supply electric power of the in-vehicle battery as the first power-supply electric power, and supply power-supply electric power of the internal rechargeable battery as the second power-supply electric power.

\* \* \* \* \*